June 29, 1926.
F. R. KLAUS
RIM
Filed Nov. 3, 1924
1,590,762
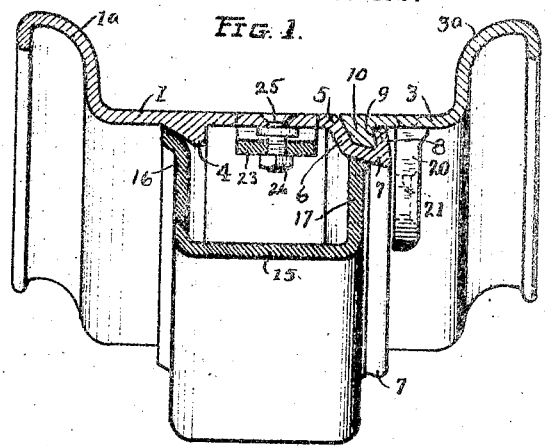
Fig. 1.
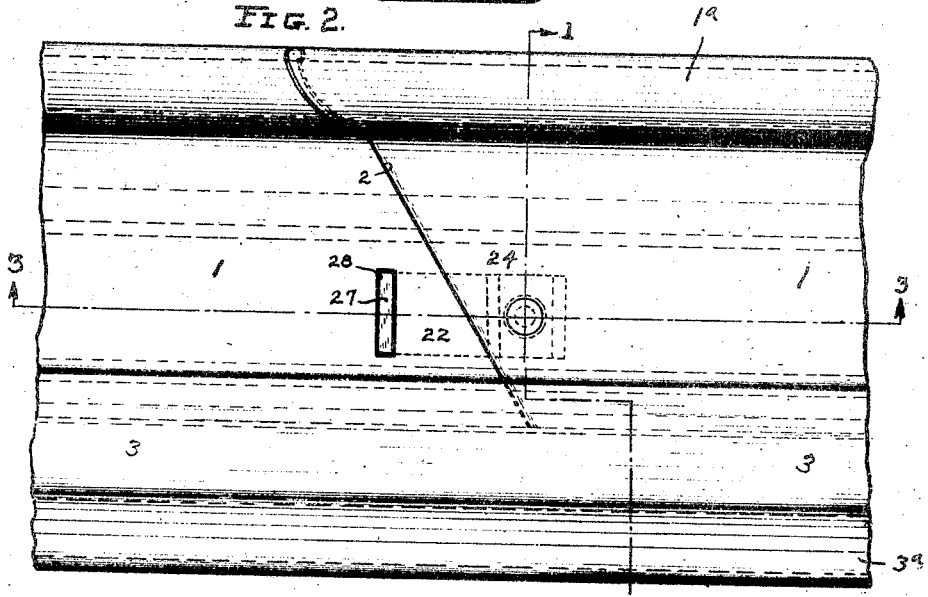
Fig. 2.
Fig. 3.
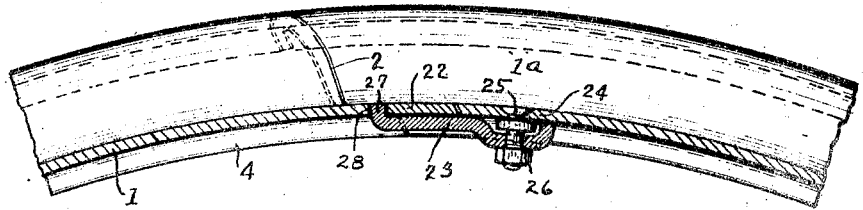
Fig. 4
Fig. 5.
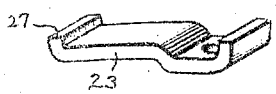
Inventor
F. R. Klaus
By Lloyd L. Evans
Attorney Patented June 29, 1926.

1,590,762

UNITED STATES PATENT OFFICE.

FRED R. KLAUS, OF WARREN, OHIO, ASSIGNOR TO AMERICAN WELDING AND MANUFACTURING COMPANY, OF WARREN, OHIO, A CORPORATION OF OHIO.

RIM.

Application filed November 3, 1924. Serial No. 747,510.

This invention relates to vehicle tire rims and more particularly to demountable rims wherein provision is made for applying and removing a vehicle tire by providing a transverse split in the rim so that it can be contracted.

An object of the invention is to provide such a rim particularly adapted for receiving tires of small diameters and also for receiving tires which are intended to be run with a relatively low air pressure.

As the diameter of a demountable rim is decreased to meet present tendencies for tires of smaller inside diameters it becomes increasingly difficult to contract a split rim having the usual integral side flanges for straight side tires, so that one end of the rim will move radially inwardly sufficiently to pass beneath the other end of the rim, and thus permit the tire to be removed from the rim.

It is also essential to provide a locking means for the split rim to prevent unintentional collapse of the rim so that the tire will be securely held on the rim and the rim, when mounted on the wheel, will at all times be securely and rigidly held in place even though a pneumatic tire with relatively low air pressure be utilized and even though sudden deflation of the tire takes place.

Further objects of my invention, therefore, are to provide a rim which can be more easily collapsed to apply or remove a tire and also to provide a rim having an endless side member which will remain securely in place when the tire carrying rim is mounted on the fixed rim of a wheel body irrespective of the amount of air pressure in the tire.

These and other objects will be apparent from the following description and annexed drawings, in which—

Figure 1 is a section on line 1—1, Fig. 2.

Fig. 2 is a plan view of the rim at the split.

Fig. 3 is a longitudinal section on line 3—3, Fig. 2.

Fig. 4 is a perspective view of the connecting plate.

Fig. 5 is a view of the stud for securing the plate to the rim.

In the drawing is shown a rim assembly comprising a one-piece base member 1, transversely split preferably diagonally of the rim as shown at 2, and an endless side member 3. The base member 1 is provided with a tire retaining flange 1$^a$ and, together with the endless side member 3 and the tire retaining flange 3$^a$, constitutes an annular rim of suitable shape to receive a straight side pneumatic tire.

Near the outer side of the base member 1 is a flange 5 having an inturned portion 6, a laterally extending portion 7 and an outturned portion 8 forming a channel 9 at the outer side of the base member 1 to receive an annular rib or flange 10 on the endless side member 3. Preferably the outturned portion 8 is inclined inwardly relative to the tire engaging surface of the base member at a relatively slight angle and preferably the inturned portion 6 is similarly inclined so that an oblique groove is formed. The endless side member 3 comprises a tire retaining flange 3$^a$ at its outer side, and at its inner side is formed with an inwardly extending annular flange or rib 10 which is correspondingly inclined to be received within the inclined walls of the channel 9. It will be seen that the flange 10 of the side member 3 substantially fills the inclined channel and terminates adjacent the inner wall of said channel and that the line of engagement at the outer surface of the rim between the base member 1 and the side member 3 is substantially within the tire bead supporting zone of the rim face.

As the radially outer face of the flange 8 is below the tire engaging surface of the base member 1, the portion of the endless side member 3, adjacent to the flange 10 is adapted to seat securely on said face and provide a tire receiving surface substantially in alignment with the surface of the base member 1. It will thus be seen that the side member 3 is rigidly held in position throughout its circumference on the channel wall 8.

The fixed rim 15 of a wheel body, which in the drawing is indicated as the usual metal box felly, has radially outwardly extending flanges 16, 17 outturned or otherwise shaped to form seats thereon to engage cooperative surfaces on the bead 4 and the flange 7 of the rim.

The rim is held upon the fixed rim 15 by any suitable holding means such as well known clamps. If desired, clamps or lugs 20 may be riveted to the endless side member 3, as indicated in Fig. 1, the clamps 20 being provided with bolt receiving apertures 21 to be engaged by a suitable bolt (not shown) passing through the fixed rim.

If it be desired to positively prevent the end 22 of the rim adjacent the split from moving radially inwardly when the tire is on the rim, a plate 23 may be removably secured to the end 24 of the rim in any suitable manner, as by the stud 25 riveted to the end 24 of the rim and carrying a nut 26 to hold the plate in place. The plate 23 extends across the split and engages the end 22 of the rim and is preferably provided with an outturned hook 27 which engages an aperture 28 formed in the end 22 of the rim.

Preferably the ends of the rim are not only cut with a diagonal transverse split, but the split is also preferably beveled at a slight angle to the radius so that the end 22 of the rim partially underlies the end 24. Thus when the tire is inflated movement of the end 24 of the rim radially inwardly will be prevented and movement of the end 22 of the rim will be prevented by the plate 23 if such be used. It will be seen that by having the wall 8 of the groove 9 inclined obliquely, movement of the ends of the rim radially inwardly will be effectively prevented when the tire is inflated as the pressure of the tire tends to force the member 3 laterally to hold the rib 10 in engagement with the flange 8.

It will be obvious from the construction that when the base member 1 carries the tire and is mounted upon the fixed rim 15 of the wheel body, a very rigid construction is obtained, as the split base member 1 seats on the flanges 16, 17 of the fixed rim 15 and the ends 22, 24 of the rim are held against radial outward movement by the endless side member 3.

When the rim is demounted from the wheel it is only necessary to contract the base member by removing the plate 23 and causing the end 22 to be moved radially inwardly an amount equal to the height of the flange 8, when the endless side member 3 can easily be removed and the tire easily taken off the rim 1. By inserting a screw driver between the flange 8 and the side member 3, the end 22 of the base member can be readily moved inwardly the small amount necessary for it to underlie the end 24 and the side member 3 can be very easily taken out of the tire by hand.

It will thus be seen that I have provided a rim particularly adapted to receive a pneumatic tire which, when the rim is mounted upon the fixed rim of a wheel body, will rigidly and securely hold the tire, even though the tire be deflated or have a relatively low air pressure and yet the tire may be readily applied to or removed from the rim.

It will also be seen that due to the fact that one end of the rim need only be moved radially inwardly a small amount it is easy to collapse the rim and the rim is adapted to receive tires having a relatively small inside diameter.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A demountable rim assembly comprising a one piece transversely split base member, a tire retaining flange formed on one edge portion of the base member and an outwardly opening annular channel formed along the other edge portion, the walls of said channel being obliquely disposed with respect to the plane of the wheel, the outer wall of said channel terminating radially inwardly of the tire seating surface of the base member, an endless side member having an inwardly extending flange at one edge adapted to be received in and substantially fill said channel and terminating adjacent the laterally inner side wall thereof, a tire retaining flange formed along the other edge portion of said side member, said side member being adapted to seat securely on the radially outer face of the outer wall of the channel.

2. A demountable rim assembly comprising a base member separated transversely with a diagonal split and having an outer tire retaining flange on one side and an outwardly opening annular channel, the outer wall of which is inclined inwardly relative to the tire engaging surface of the base member, and a one-piece, endless, annular side member having a tire retaining flange at one side and terminating at the other side in an inwardly extending rib adapted to fit within said channel.

3. A demountable rim assembly comprising a one piece transversely split base member having the opposing faces of the transverse split so beveled that one end portion overlies the other end portion of the base member at the split, said transverse split extending diagonally across the base member, a tire retaining flange formed on one edge portion of the base member and an outwardly opening annular channel formed along the other edge portion, the outer wall of said channel terminating radially inwardly of the tire seating surface of the base member, an endless side member having an inwardly extending flange at one edge adapted to be received in and substantially fill said channel and terminating adjacent the laterally inner side wall thereof, a tire retaining flange formed along the other edge portion of said side member, said side member being adapted to seat securely on the radially outer face of the outer wall of the channel.

4. A demountable rim assembly comprising a base member separated transversely with a diagonal split and having an outer tire retaining flange on one side and an outwardly opening annular channel on the other side, the outer wall of said channel being inclined inwardly relative to the tire engaging surface of the base member, and a one-piece, endless, annular side member having a tire retaining flange at one side and terminating at the other side in an inwardly extending rib adapted to fit within said channel, the ends of said base member being beveled at a relatively small angle to the radial direction.

5. A demountable rim assembly comprising a base member separated transversely with a diagonal split and having an outer tire retaining flange on one side and an outwardly opening annular channel on the other side, the outer wall of said channel being inclined relative to the tire engaging surface of the base member, and a one-piece, endless, annular side member having a tire retaining flange at one side and terminating at the other side in an inwardly extending rib adapted to fit within said channel, the ends of said base member being beveled at a relatively small angle to the radial direction, and a plate removably carried by one end of the base member adjacent the split and extending across the split.

6. A demountable rim assembly comprising a base member separated transversely with a diagonal split and having an outer tire retaining flange on one side and formed at its other side with inwardly and outwardly extending flanges forming an outwardly opening annular channel, a one-piece, endless, annular side member having a tire retaining flange on one side and terminating at the other side in an inwardly extending rib adapted to fit within said channel, and a removable plate carried by one end of the base member adjacent the split and extending across the split, said base member ends being beveled so that they incline radially outwardly toward the end of the base member to which said plate is secured.

7. A demountable rim assembly comprising a base member separated transversely with a diagonal split and having an outer tire retaining flange on one side and formed at its other side with inwardly and outwardly extending flanges providing an outwardly opening annular channel, the outer wall of which is inclined inwardly relative to the tire engaging surface of the base member, and a one-piece, endless annular side member having a tire retaining flange at one side and terminating at the other side in an inwardly extending rib adapted to fit within said channel, the ends of said base member being beveled at a relatively small angle to the radial direction.

8. A demountable rim assembly comprising a one-piece base member transversely separated and having a tire retaining flange formed along one edge portion and an annular channel formed along the other edge portion, said annular channel having its outer side wall inwardly inclined relative to the tire engaging surface of the base member, one of the radially inner faces of the channel portion thereof forming a seating surface for the base member adapted to be engaged by a wheel assembly, and an endless side member adapted to seat securely on the radially outer wall of the channel and having an inwardly extending annular rib formed along one edge portion thereof and a tire retaining flange formed along the other edge portion thereof, said rib portion being disposed within the bead supporting zone of the rim face.

9. A demountable rim assembly comprising a single piece base member separated transversely and having a tire retaining flange formed by one edge portion and an annular channel formed by the other edge portion of the base member, the outer wall of the channel being inwardly inclined relative to the tire engaging surface of the base member, and an endless side member having an inwardly extending oblique annular rib adapted to enter and substantially fill the channel and interlock with the base member through the action of a tire mounted on said rim to prevent disengagement of said members when the rim assembly is demounted, said endless side member terminating adjacent the inner wall of the channel, and having a tire retaining flange formed by the other edge portion thereof.

In testimony whereof, I hereunto affix my signature.

FRED R. KLAUS.